(12) United States Patent
Crumm

(10) Patent No.: US 7,887,975 B2
(45) Date of Patent: Feb. 15, 2011

(54) CLAD COPPER WIRE HAVING ENVIRONMENTALLY ISOLATING ALLOY

(75) Inventor: Aaron Crumm, Ann Arbor, MI (US)

(73) Assignee: Adaptive Materials, Inc., Ann Arbor, MI (US)

(*) Notice: Subject to any disclaimer, the term of this patent is extended or adjusted under 35 U.S.C. 154(b) by 117 days.

(21) Appl. No.: 12/044,355

(22) Filed: Mar. 7, 2008

(65) Prior Publication Data

US 2008/0241605 A1  Oct. 2, 2008

Related U.S. Application Data

(60) Provisional application No. 60/893,404, filed on Mar. 7, 2007.

(51) Int. Cl.
*H01M 4/64* (2006.01)
*H01M 8/24* (2006.01)
*H01M 8/10* (2006.01)

(52) U.S. Cl. .................. 429/522; 429/466; 429/495; 429/497

(58) Field of Classification Search ............. 429/12–46, 429/400–535
See application file for complete search history.

(56) References Cited

U.S. PATENT DOCUMENTS

| 6,403,517 | B1* | 6/2002 | Eshraghi ............... 502/101 |
| 2002/0182468 | A1* | 12/2002 | Janousek et al. ........... 429/30 |
| 2005/0084732 | A1* | 4/2005 | Breault et al. ............. 429/34 |
| 2005/0147857 | A1* | 7/2005 | Crumm et al. ............. 429/31 |
| 2005/0196657 | A1* | 9/2005 | Sarkar et al. ............. 429/31 |
| 2006/0000632 | A1* | 1/2006 | Thompson et al. ........ 174/74 R |

OTHER PUBLICATIONS

Jones, H. et al, 50 Tesla Pulsed Magnets Using A Copper Conductor Externally Reinforced With Stainless Steel, Mar. 1988, IEEE Transactions on Magnetics, vol. 24, No. 2, pp. 1055-1058.*

* cited by examiner

*Primary Examiner*—Basia Ridley
*Assistant Examiner*—Jonathan G Leong
(74) *Attorney, Agent, or Firm*—Dickinson Wright PLLC

(57) ABSTRACT

A current collector for a fuel cell that includes at least one wire having an inner core of high conductivity metal and an outer cladding of an environmentally isolating material. The current collector may be utilized in both an oxidizing and reducing environment.

12 Claims, 7 Drawing Sheets

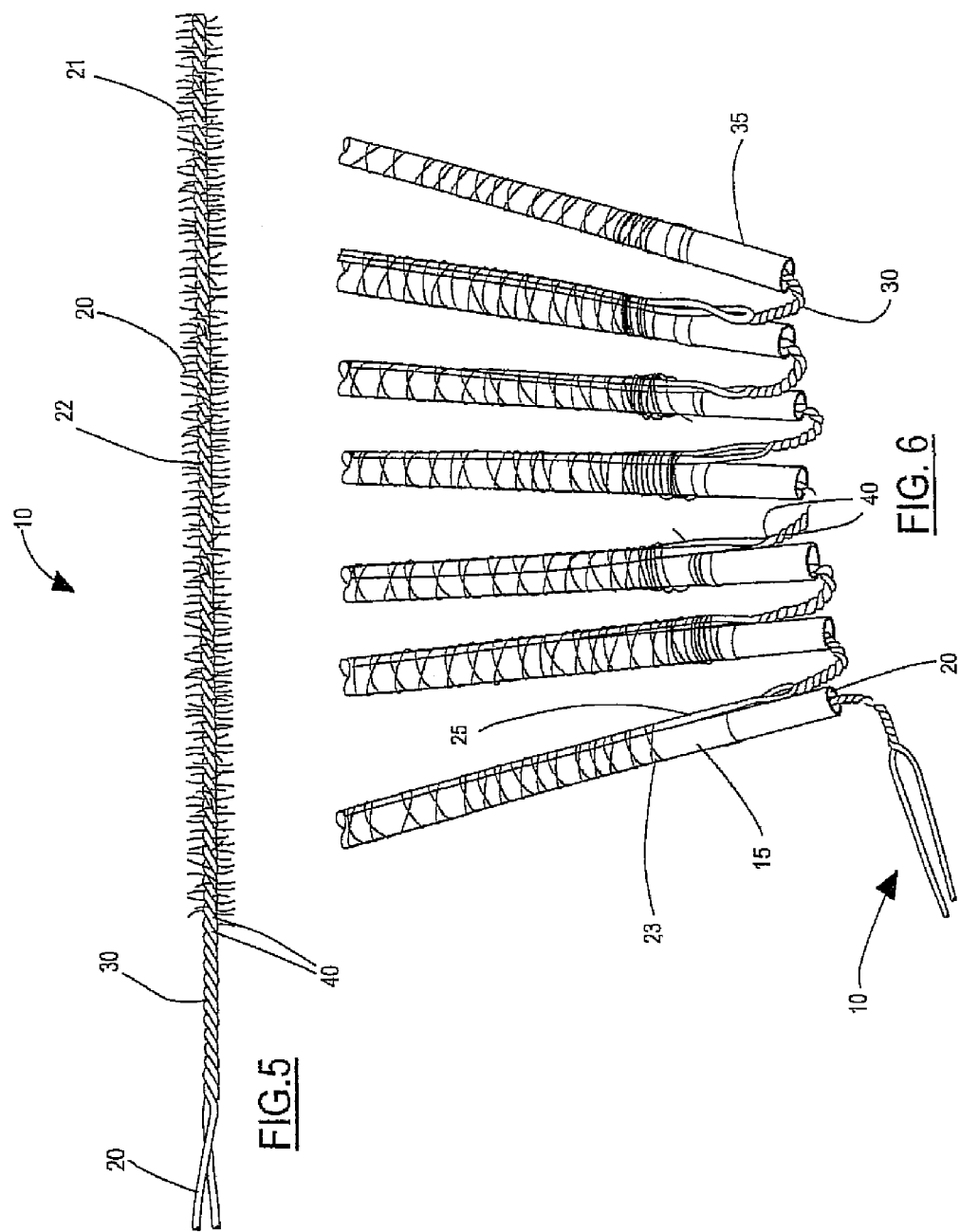

| Copper diameter mm | O.D. (Crofer shell) | mOhms Per length cm | Copper Equivalence |
|---|---|---|---|
| 0.65 | n/a | 0.9 | 1.00 |
| 0.49 | 0.65 | 1.6 | 0.56 |
| 0.25 | 0.65 | 5.5 | 0.16 |
| 0.15 | 0.65 | 12.6 | 0.07 |
| 0 | 0.65 | 46.7 | 0.02 |

US 7,887,975 B2

CLAD COPPER WIRE HAVING ENVIRONMENTALLY ISOLATING ALLOY

RELATED APPLICATIONS

This application claims priority of U.S. Provisional Patent Application Ser. No. 60/893,404 filed Mar. 7, 2007, which is incorporated herein by reference.

BACKGROUND OF THE INVENTION

Current collectors and wire interconnects for use in fuel cells are exposed to various environments that affect the chemical structure and conductivity of such interconnects and wires. Specifically, in a solid oxide fuel cell the current collector system may include an anode current collector that is exposed to reducing gases, a cathode current collector that is exposed to oxidizing gases, and interconnects between the anode and cathode which must be exposed to both environments. Various metal compositions can be used in different portions of the interconnect and current collector system to provide resistance to the various environments. However, it would be desirable to have a single wire composition that may be utilized in a variety of different environments and maintain the conductivity of the wire, such as current collectors and interconnects as well as have environmental protection to the various conditions.

SUMMARY OF THE INVENTION

In one aspect there is disclosed a current collector for a fuel cell that includes at least one wire having an inner core of high conductivity metal and an outer cladding of an environmentally isolating material. The current collector may be utilized in both an oxidizing and reducing environment.

In another aspect, there is disclosed a current collector for a solid oxide fuel cell that includes at least one wire having an inner core of high conductivity metal and an outer cladding of an environmentally isolating material. The current collector may be utilized in both an oxidizing and reducing environment. The at least one wire is formed of a continuous segment.

In another aspect there is disclosed a current collector for a solid oxide fuel cell that includes at least one wire having an inner core of high conductivity metal and an outer cladding of an environmentally isolating material. The current collector may be utilized in both an oxidizing and reducing environment. The at least one wire is formed of a plurality of segments joined together. At least one of the segments includes an inner core of high conductivity metal and an outer cladding of an environmentally isolating material.

BRIEF DESCRIPTION OF THE DRAWINGS

FIG. 5 is a partial side view of a current collector including anode and cathode portions;

FIG. 6 is a partial perspective view showing a plurality of current collectors of FIG. 5 associated with a plurality of fuel cell tubes;

DETAILED DESCRIPTION OF THE PREFERRED EMBODIMENTS

Figure 1:
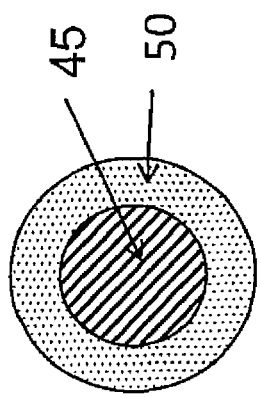
FIG. 1 is an end view of a wire having a central core and an outer layer.

Referring to FIGS. 5 and 6 there is shown one embodiment of a current collector 10 for use in a fuel cell. In one aspect the fuel may be a solid oxide fuel cell having a plurality of fuel cell tubes 15 that may be disposed in a housing (not shown). The current collector 10 may be connected to the anode and cathode of the fuel cell tubes to allow for transmission of electrons. The current collector may include an anode portion 20, a cathode portion 25 and an interconnect portion 30 between the anode and cathode portions 20, 25 that may be positioned in a hot exhaust zone 35 of the fuel cell tubes 15, as best seen in FIG. 6. In one aspect, the current collector 10 includes at least a portion that is continuous.

As shown in FIG. 5, the anode portion 20 may include a plurality of bristles 21 that are attached to a stem 22. The bristles 21 may be formed of the same material as the stem 22 or may be formed of other materials such as nickel. The bristles may include a catalytic wire wrapped around the stem 22. Any portion of the brush may be formed of the wire described above and may include further layers such as a layer to attach the brush wires to the fuel cell. For example, the brush wires may include a pre brazing layer that can be used to attached the brush wires to the fuel cell and provide a stabilized or supported fuel cell. Alternatively, the anode portion 20 may not include bristles and may be sintered, brazed or otherwise attached to the anode of the fuel cell tube 15. The stem 22 may be a single wire 40 or may include various numbers of wires 40 braided together as shown in FIG. 5. The interconnect portion 30 extends from the stem 22 of the anode portion 20 and may be braided as shown or may include non-braided multiple wires 40 or a single wire 40. The cathode portion 25 extends from the interconnect portion 30 and may be attached to a fuel cell tube 15 using a wire 23 as shown in FIG. 6 or may alternatively be sintered, brazed or otherwise attached to the cathode of the fuel cell tube 15. The cathode portion 25 may include multiple wires 40, as shown in the figure or may be a single wire 40. The current collector 10 may be utilized in both an oxidizing environment of the cathode, a reducing environment of the anode and the mixed environment of the interconnect. Such a current collector may include at least a portion that is continuous thereby reducing the cost, manufacturing complexity and processing of a current collector 10.

In one aspect, the current collector 10 includes at least one wire 40 having an inner core 45 of a highly conductive material, such as copper or a copper containing alloy and an outer layer or cladding 50 of an environmentally resistant material. Various environmentally resistant materials including stainless steels, precious metals, nickel alloys and cobalt alloys may be used. In one aspect, the environmentally resistant material may be a high temperature stainless steel. An example of a preferred stainless steel includes Crofer 22 APU developed by ThyssenKrupp. Crofer 22 APU includes favorable properties for use in both reducing and oxidizing gases. Additionally, the thermal expansion of the Crofer 22 APU is desirable and matches operating expansions similar to that used in solid oxide fuel cell components. The Crofer 22 APU has low chromium volatility and a relatively good electrical conductivity of a protective oxide film that forms upon oxidation. The oxidative film formed on Crofer 22 APU includes manganese chromium oxide spinet. Crofer 22 APU is an alloy of 77.4% iron, 22% chromium and 0.6% manganese.

While Crofer 22 APU has a favorable property of environmental compatibility to both reducing and oxidizing conditions, the Crofer 22 APU has a relatively poor electrical conductivity. Utilizing a copper core 45 and Crofer 22 APU cladding 50 it is possible to have a low resistivity core of copper with an environmentally resistant cladding of Crofer 22 APU. Such a wire 40 would provide improved conductivity as well as provide protection from various environments.

Figure 2:
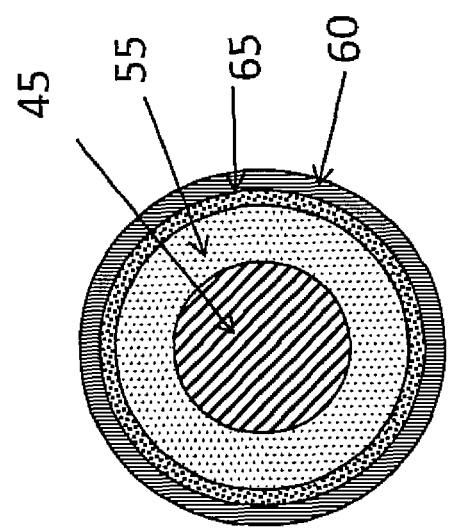
FIG. 2 is an end view of a wire having a core, one or more intermediate layers, and an outer layer.

Referring to FIG. 2, there is shown an alternative embodiment including a core 45, as described above, one or more intermediate layers, 55 and an outer layer 60. The various layers may be selected to provide functionality that includes oxidation resistance, catalytic properties, minimizes carbon formation, promotes bonding between the wire and nearby structures, provides a barrier to the release or uptake of detrimental elements and compounds, acts as a getter for undesired elements or compounds entering or leaving the wire, acts as a barrier between reactive materials in wires adjusts the coefficient of thermal expansion, or enhances the mechanical properties of the wire 40.

Figure 9:
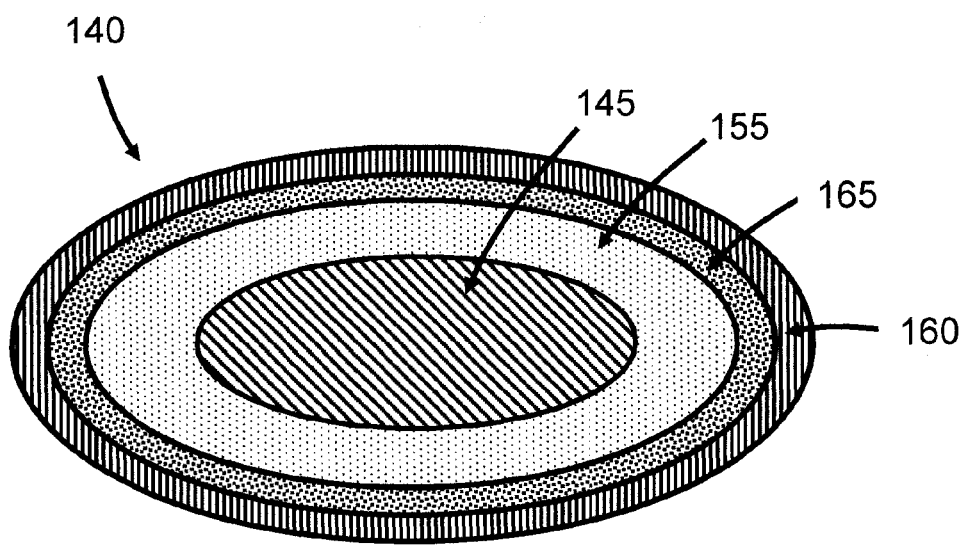
FIG. 9 is a cross-sectional view of a wire in accordance with another exemplary embodiment of the present disclosure.

FIG. 9 depicts a wire 140 with a non-circular cross-section. A wire 140 includes a core 145, one or more intermediate layers 155, 165 and an outer layer 160. The core 145, the intermediate layers 155, 165 and the outer layer 160 can comprise materials described above for the core 45, the intermediate layer 55, 65, and the outer layer 60, respectively.

Oxidation resistance of the core 45, outer 60 and intermediate layers 55, may be achieved using various materials that retard oxide formation in the oxidative environments. Various environmentally isolating materials may be used in the outer layer 60 or intermediate layer 55 and include stainless steels, nickel alloys, cobalt alloys, and precious metals. In one aspect, the oxidation resistant material may be gold or platinum preventing oxidation of an environmentally isolating layer in the intermediate layer 55. Another preferred embodiment is the use of stainless steel materials specifically tailored for use in oxidative environments requiring electrical contact between components during operation. This family of materials includes but is not limited to trade names such as Haynes, E-Brite, Crofer, Hastelloy. The oxidation resistant material may be placed as a thin deposited layer as the outer layer 60 over the environmentally isolating layer of the intermediate layer 55. In this manner the conductive copper core 45 provides a conductive path for electron transfer and the environmentally isolating material of the intermediate layer 55 prevents alloying with the oxidation resistant outer layer 60.

Haynes (Hayes International) 230 comprises Ni-57 weight %, Cr-22 weight %, W-14 weight %, Fe-3 weight %, Co-5 weight %, Mn- 0.5 weight %, Si-0.4 weight %, Al-0.3 weight %, C-0.10 weight %, La-0.02 weight %, and B 0.015 weight %. Alumel (Hoskins Manufacturing) comprises Ni-95 weight %, Mn-2 weight %, Al-2 weight %, and Si-1 weight %. E-brite (Allegheny Ludlum) comprises Ni-0.09 weight %, Cr-26.0 weight %, Mo-1.0weight %, C-0.001 weight %, Mn-0.01 weight %, Si-0.025 weight %, P-0.02 weight %, S-0.02 weight %, N-0.01 weight %, Cu-0.03 weight %, and Fe-Balance. MPN LT35 comprises Ni-35 weight %, Co-33.5 weight %, Cr-20.5 weight %, Mo-9.5 weight %, Ti-0.01 weight %, Fe-0.05 weight %, C-0.01 weight %, and B-0.01 weight %. Crofer (ThyssenKrupp VDM) comprises Cr-20.0-24.0, weight %, Fe-Balance, C-0.03 weight %, Mn-0.30-0.80 weight %, Si-0.50 weight %, Cu-0.50 weight %, Al-0.50 weight %, S-0.020 weight %, P-0.050 weight %, Ti 0.03-0.20 weight %, and La weight % 0.04-0.20.

Additional layers 65 as the term is used may be one or more layers the act as the intermediate layer 55 or the outer layer 60 or may be in addition to the intermediate 55 and outer layer 60 and may be positioned in various locations relative to the core 45, intermediate 55 or outer layers 60. The Additional layers 65 in conjunction with or without the intermediate 55 or outer layer 60 may be configured to provide various properties to the wire 40. The additional layers 65 may be positioned as the outer layer 60 or may be positioned as an intermediate layer 55. The additional layers 65 may provide a catalyst function. In one aspect, the additional layer 65 may be formed of a material from the family of metallic catalyst materials such as nickel, ruthenium, platinum, cerium, palladium, and zirconium. In this configuration, the additional layers 65 of the wire 40 may act directly as the reaction catalyst. In another aspect, the additional layers 65 may be configured to provide one or more layers that act as supporting structures for catalytic materials added during subsequent processing steps.

Further, the additional layers 65 may be configured in a manner that provides a bond between the wire 40 and nearby structures. In one aspect, the additional layers 65 may include a braze compound suitable for bonding between the wire and the nearby structure. Various braze compounds may be utilized. The additional layers 65 may also include a particulate containing material as the outer layer 60 designed to sinter bond between the wire 40 and nearby structures.

The additional layers 65 may also include materials selected to provide resistance to carbon deposition on the surface of the wire 40 in environments that contain carbon compounds. For example, an additional layer 65 including ferritic stainless steel may be used to prevent the formation of carbon.

The additional layers 65 may also include materials that may act as an isolating material that reduces the release of chrome and chrome containing compounds from the wire 40 into surrounding structures. An example of such a material would include: lanthanum, ceria, manganese, and/or cobalt individual and/or in combinations. The additional layer 65 may also include materials that restricts the chemical reactions or alloying reaction between one of more of the materials in the core 45, intermediate layer 55, or outer layer 60. Examples of such materials include: gold and stainless s alloys that prevents the reaction of materials of the core and other structures. Further, the additional layers 65 may include materials to act as a getter for elements in compounds that may be released or enter the wire 40. The selection of an appropriate getter material would be made based on the materials utilized. One preferred embodiment would be the use of lanthanum/strontium/manganese (LSM) alone or LSM & Yttria Stabilized Zirconia (YSZ) composite to getter the volatilization of chrome and chrome containing compounds from the wire 40 and into surrounding structures and materials.

The additional layers 65 may also include materials that provide enhanced mechanical properties. One embodiment may use tungsten or another high temperature element or alloy to enhance the creep tolerance of the wire at elevated temperatures. Other embodiments would include the use of the metallic elements or alloys in one or more layers to enhance the wire stiffness, tensile strength, coefficient of thermal expansion, toughness, or ductility in desired operating environments.

Figure 3:
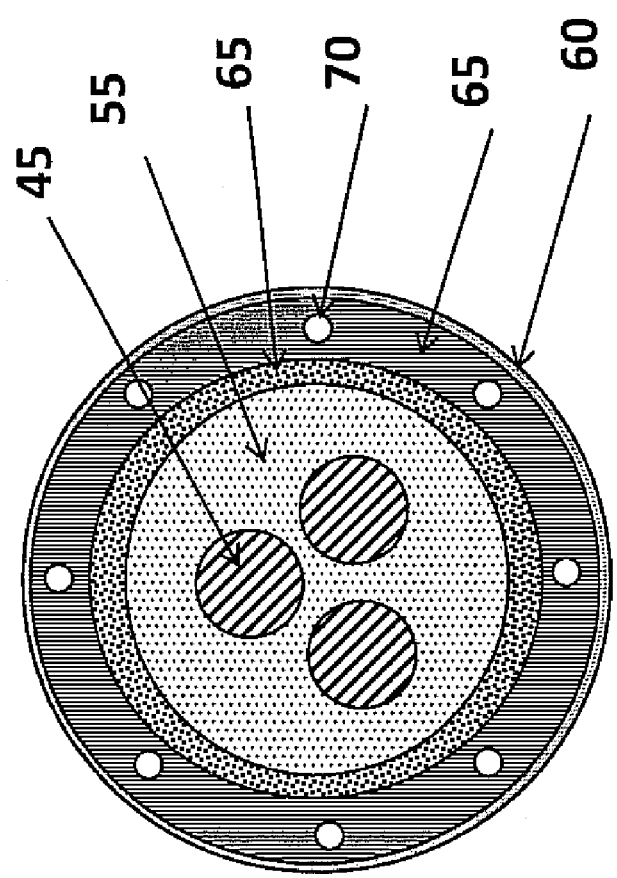
FIG. 3 is an end view of a wire having a two dimensional architecture of functional components, one or more intermediate layers, and an outer layer.

Referring to FIG. 3, the geometry and form factor of the wire 40 structure can be structured into a variety of two dimensional patterns. As shown in FIG. 3, many of the functions outlined in the previous sections can be achieved using non-concentric layer designs. The embodiment shown in FIG. 3 depicts a series of three central core wires 40 designed to enhance the creep tolerance of the wire. The three central wires are contained within a highly conductive matrix acting as an intermediate layer 55. An additional layer 65 having a material that provides a barrier to chemical reaction and alloying may be used between the highly conductive matrix material intermediate layer 55 and the environmental tolerant layer acting as the outer layer 60. Another additional layer 65 may include a material for environmental tolerance may also be present. The additional layer 65 may include an array of secondary structures 70 to enhance the ultimate tensile strength of the wire 40. The outer layer 60 in FIG. 3 may act as a bonding layer between the wire 40 and the surrounding structure (not shown).

Figure 4:
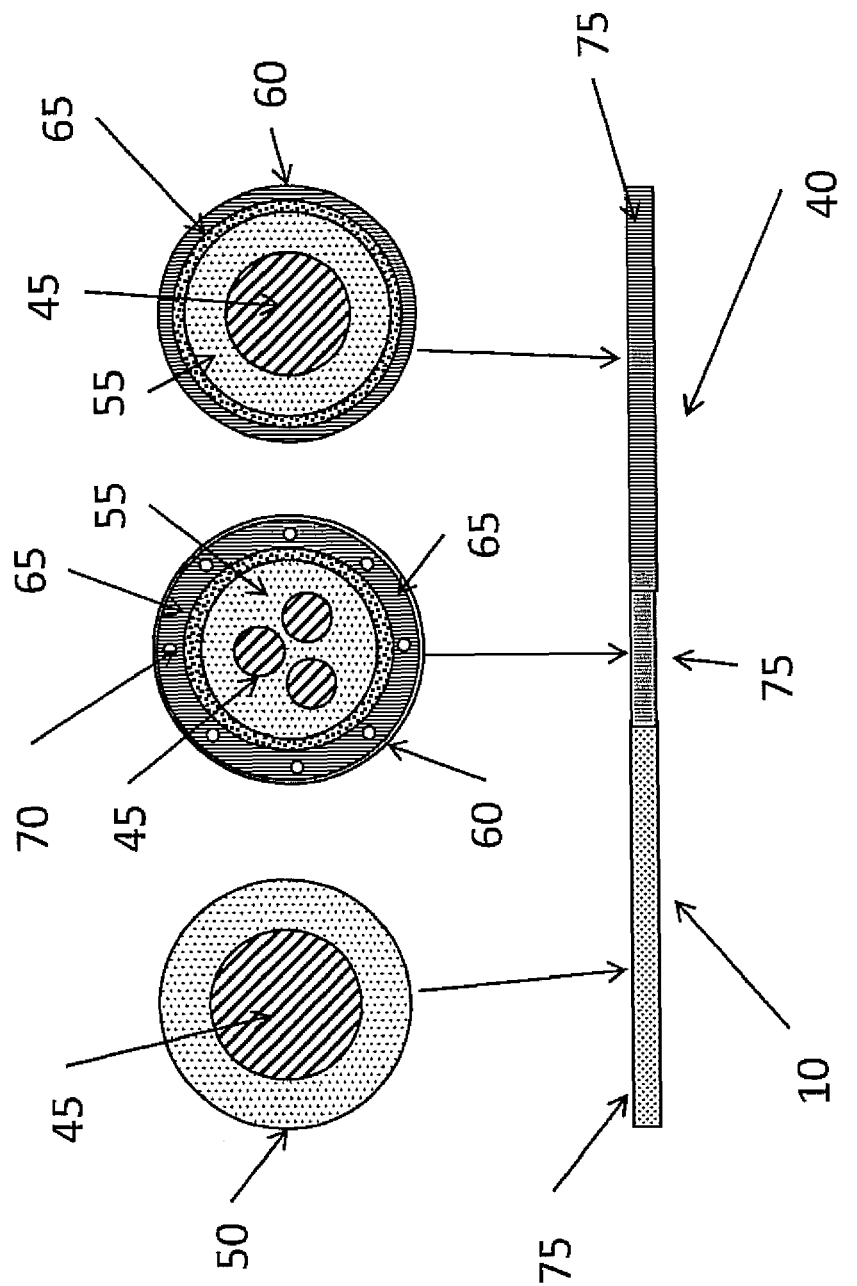
FIG. 4 is an end view of a wire having axial variations in the wire composition created via joining dissimilar segments together.

Referring to FIG. 4, there is shown a portion of a wire 40 that may be used as a current collector 10. The wire 40 of FIG. 4 may include a plurality of segments 75 that may be joined to form a current collector 10. In the embodiment depicted in FIG. 4 there are three segments 75 of the wire 40 bonded in series. Although any number of segments 75 may be utilized. The segments 75 may have differing structures including different core 45, intermediate 55, additional layers 65 and outer layers 60.

Figure 7:
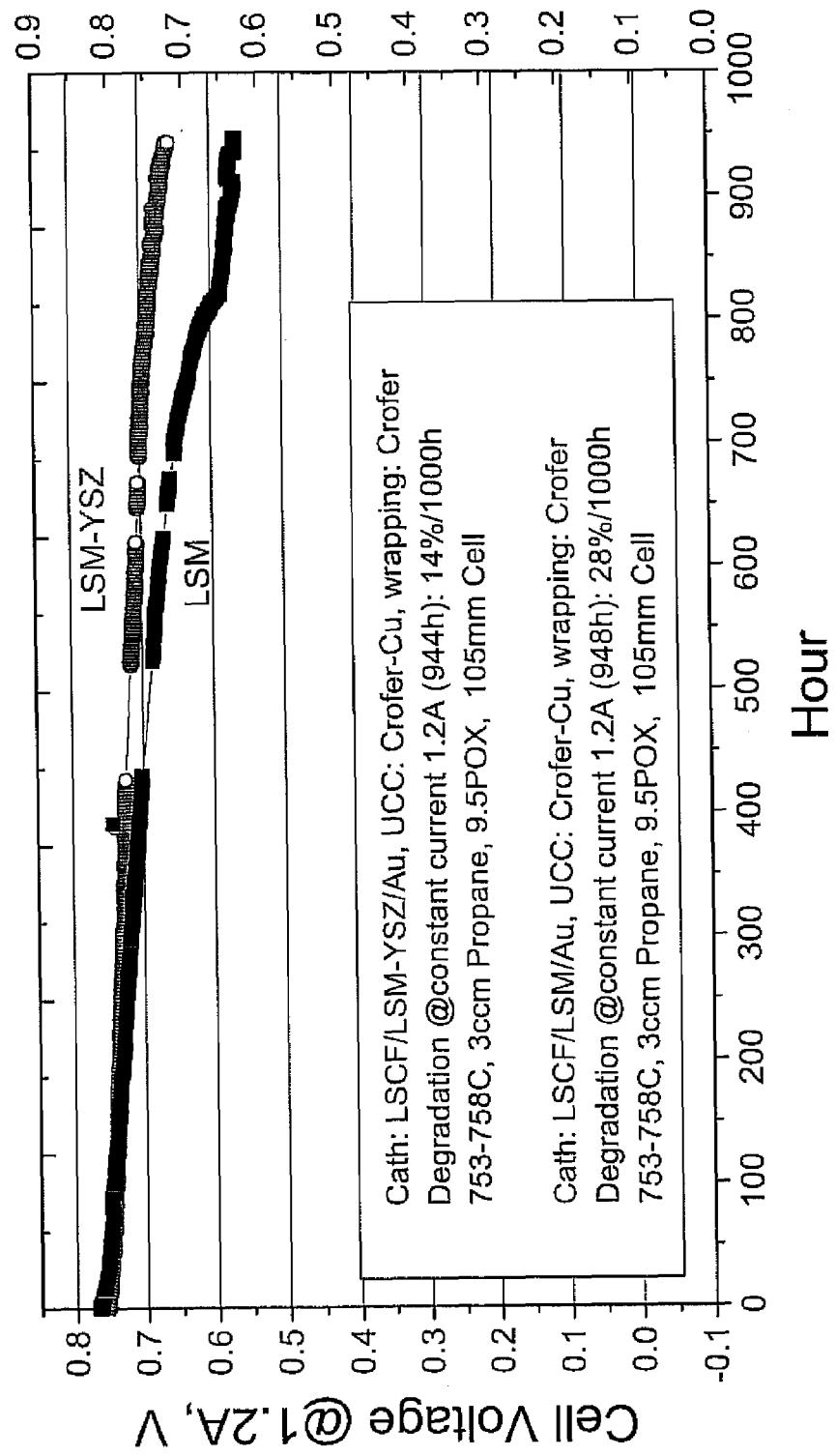
FIG. 7 is a graph of the voltage versus time for a current collector having a copper core and Crofer cladding material.

Referring to FIG. 7, there is shown a graph of a fuel cell voltage plotted versus time. The example data is from a wire 40 that has a core 45 of copper and an environmentally isolating cladding 50 of Crofer. The wire 40 is utilized as a current collector 10 that has a continuous structure in both the anode 20, cathode 25 and interconnect 30 portions. The upper plot line is for a Fuel cell having a cathode of LSM (lanthanum/strontium/manganese)—YSZ (yttria stabilized zirconia) and the lower plot line is for a cathode having LSM. As can be seen from the plots, the current collector has an endurance of close to 1000 hours without significant degradation in the cell voltage. In comparison, a current collector formed of a continuous copper material would fail within minutes.

Figure 8:
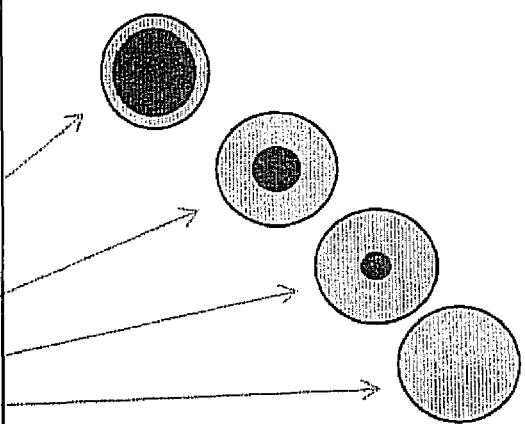
FIG. 8 is a table and graphical depiction of wires having various copper core diameters and Crofer cladding material detailing the resistance and copper equivalence of the wires.

Referring to FIG. 8, there is shown a table listing wires 40 having various copper core 45 diameters and Crofer environmentally isolating cladding 50. As can be seen in the table, the wires 40 having the copper core 45 and Crofer environmentally isolating layer have a relatively low resistance and high copper equivalent. Such wires may be used as a current collector to provide good conductivity and may be used in both an oxidizing and reducing environment.

The above described embodiments may be used in various applications in a solid oxide fuel cell. The wires may be used as current collectors and interconnect wires that would eliminate the need for weld joints joining the various sections, as the wire would be compatible in oxidation and reducing environments. Alternatively one portion of the wire may be used in one section of the fuel cell and be bonded or welded to another section of the fuel cell. For example the anode current collector may be formed of the wire and joined to the cathode current collector using a suitable interconnect.

The invention has been described in an illustrative manner. It is to be understood that the terminology, which has been used, is intended to be in the nature of words of description rather than limitation. Many modifications and variations of the invention are possible in light of the above teachings. Therefore, within the scope of the appended claims, the invention may be practiced other than as specifically described.

The invention claimed is:

1. A solid oxide fuel cell comprising:
a plurality of solid oxide fuel cell tubes providing exhaust fluid to an exhaust zone and a current collector,
the current collector electrically connecting the inner electrode of a first solid oxide fuel cell tube to an outer electrode of a second solid oxide fuel cell tube,
wherein the current collector comprises an inner core of high conductivity metal and an outer cladding of an environmentally isolating alloy,
wherein an anode portion of the current collector contacts an anode of a first solid oxide fuel cell tube of the plurality such that the electrons are conducted from the anode, through the environmentally isolating alloy to the conductive core of the current collector,
wherein a cathode portion of the current contacts a cathode portion of the solid oxide fuel cell tube to transfer electrons from the current collector to the cathode portion of the fuel cell tube, and
wherein an interconnect portion of the current collector comprises both the inner core of high conductivity metal and the outer cladding of the environmentally isolating alloy and is located between the anode portion and the cathode portion, and is positioned in a hot exhaust zone of the fuel cell tubes.

2. The solid oxide fuel cell of claim 1, wherein the outer cladding of environmentally isolating material forms an electrically conductive oxide layer.

3. The solid oxide fuel cell of claim 1, wherein the outer cladding is selected from the group consisting of: nickel alloys, cobalt alloys, and precious metals.

4. The solid oxide fuel cell of claim 1 wherein the inner core is selected from the group consisting of: copper, copper containing alloys, gold, silver, platinum, nickel and metals having a high conductivity.

5. The solid oxide fuel cell of claim 1 further including an intermediate layer surrounding the inner core, the intermediate layer surrounded by an outer layer.

6. The solid oxide fuel cell of claim 5 wherein the intermediate layer is formed of an environmentally isolating material and the outer layer is formed of an oxidation resistant material.

7. The solid oxide fuel cell of claim 5, comprising a wire having a non-circular cross section.

8. The solid oxide fuel cell of claim 5 including at least one additional layer selected from the group consisting of: a bonding layer, a catalyst layer, a protective layer, a catalyst support layer, a layer that inhibits carbon deposition and formation in environments containing carbon containing species, a sinter bonding layer, a barrier layer to chromium vaporization, a getter layer, a layer containing a braze material, and a layer providing creep tolerance at elevated temperatures.

9. The solid oxide fuel cell of claim 8 wherein one or more of the inner core, intermediate layer, outer layer and additional layer is configured in a two dimensional pattern.

10. The solid oxide fuel cell of claim 8 wherein one or more of the inner core, intermediate layer, outer layer and additional layer is configured in a non-concentric ring geometry.

11. The solid oxide fuel cell of claim 1, wherein the outer cladding comprises an alloy comprising 20%-26% chromium.

12. The solid oxide fuel cell of claim 11, wherein the alloy of the outer cladding further comprises at least one of nickel and iron.

* * * * *